US012613965B2

(12) United States Patent
Offenberg et al.

(10) Patent No.: US 12,613,965 B2
(45) Date of Patent: *Apr. 28, 2026

(54) SECURITY-ENHANCED DATA STORAGE DEVICE FOR AEROSPACE APPLICATIONS

(71) Applicant: Seagate Technology LLC, Fremont, CA (US)

(72) Inventors: Manuel A. Offenberg, South Lake Tahoe, CA (US); Jon D. Trantham, Chanhassen, MN (US); Hemant Mane, Pune (IN); Kristofer Carlson Conklin, Minneapolis, MN (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 18/237,552

(22) Filed: Aug. 24, 2023

(65) Prior Publication Data

US 2024/0069798 A1 Feb. 29, 2024

Related U.S. Application Data

(60) Provisional application No. 63/420,818, filed on Oct. 31, 2022.

(30) Foreign Application Priority Data

Aug. 26, 2022 (IN) ............................. 202221048895

(51) Int. Cl.
*G06F 21/57* (2013.01)
*G06F 3/06* (2006.01)
(Continued)

(52) U.S. Cl.
CPC ............ *G06F 21/57* (2013.01); *G06F 3/0644* (2013.01); *G06F 3/0652* (2013.01);
(Continued)

(58) Field of Classification Search
CPC ...... G06F 21/57; G06F 3/0644; G06F 3/0652; G06F 3/0658; G06F 21/572; G06F 21/78; G06F 21/85; G06F 3/0623; G06F 3/0683
See application file for complete search history.

(56) References Cited

U.S. PATENT DOCUMENTS 6,104,211 A * 8/2000 Alfke .................... G06F 11/183
326/14
6,324,102 B1 * 11/2001 McCollum ............. G11C 5/005
365/185.29
(Continued)

OTHER PUBLICATIONS

U.S. Appl. No. 17/869,238, filed Jul. 20, 2022, Trantham.

*Primary Examiner* — Cheng-Feng Huang
(74) *Attorney, Agent, or Firm* — Mueting Raasch Group

(57) ABSTRACT

A system for use in an aerospace environment includes an array of storage drives each comprising a non-radiation-hardened drive controller, a non-radiation-hardened, non-volatile, storage medium, and a non-radiation-hardened volatile memory. The system includes a radiation-tolerant storage controller coupled to the array. The storage controller provides failure-resistant data redundancy among the storage drives of the array. The system includes a bus host that accesses the array via the storage controller. The storage controller implements security logic and a root-of-trust that provides to the bus host verification of authenticity of the radiation tolerant storage controller and the storage drives.

20 Claims, 4 Drawing Sheets

(51) Int. Cl.
　　G06F 21/78　　　　(2013.01)
　　G06F 21/85　　　　(2013.01)

(52) U.S. Cl.
　　CPC .......... G06F 3/0658 (2013.01); G06F 21/572
　　　　　　(2013.01); G06F 21/78 (2013.01); G06F
　　　　21/85 (2013.01); *G06F 3/0623* (2013.01);
　　　　　　　　　　　　*G06F 3/0683* (2013.01)

(56)　　　　　　References Cited

U.S. PATENT DOCUMENTS

| | | | |
|---|---|---|---|
| 7,589,558 B1 * | 9/2009 | Tseng | G06F 30/34 |
| | | | 326/41 |
| 10,466,937 B2 | 11/2019 | Berger | |
| 10,503,597 B2 * | 12/2019 | Taranta | G06F 16/13 |
| 10,521,295 B2 | 12/2019 | Merl | |
| 10,997,297 B1 * | 5/2021 | Lin | H04L 9/30 |
| 2018/0241503 A1 * | 8/2018 | Harper | H04L 1/0058 |
| 2019/0087271 A1 * | 3/2019 | Taranta | G06F 3/0611 |
| 2022/0171694 A1 * | 6/2022 | Haldeman | G06F 9/30098 |

* cited by examiner

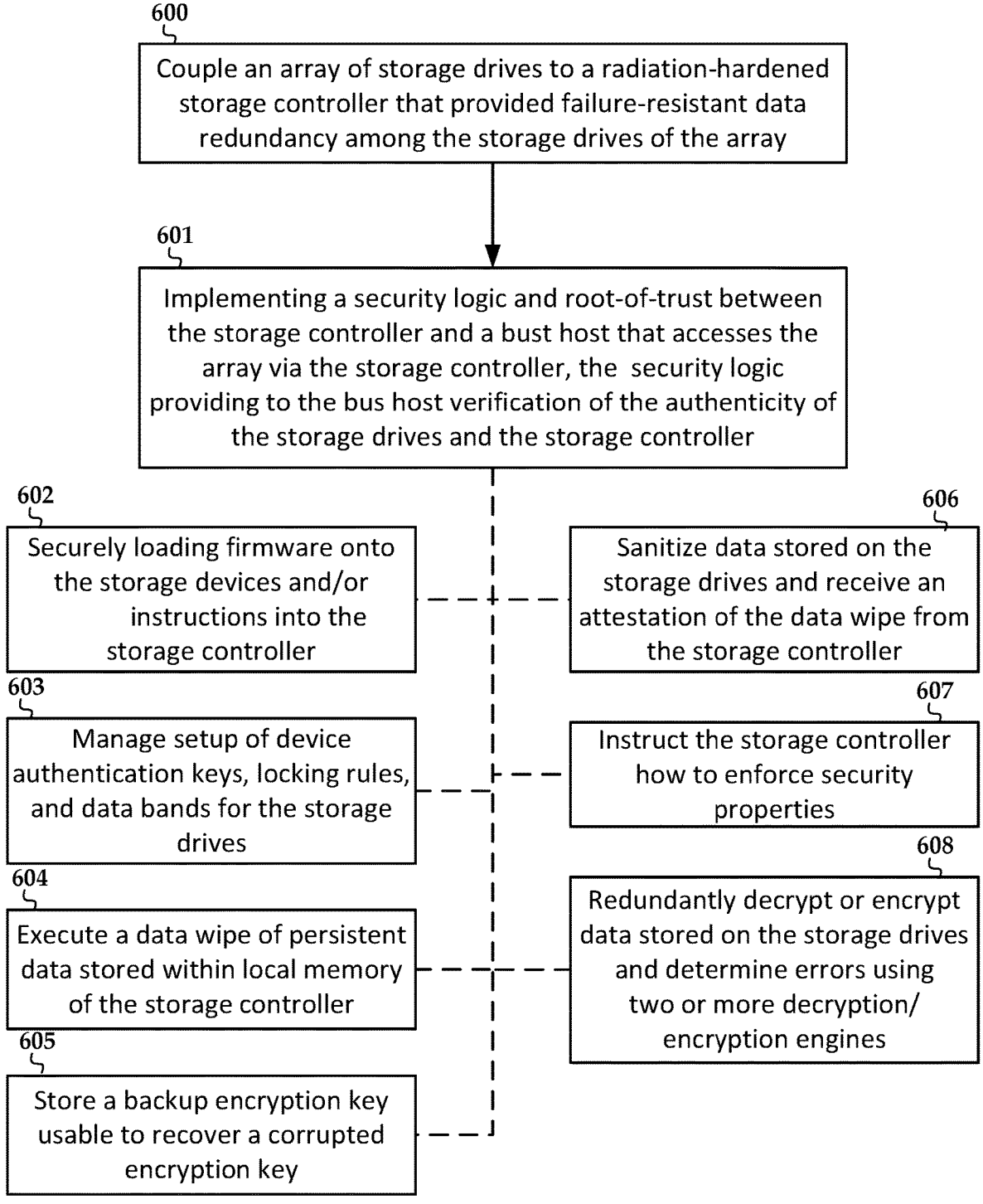

600

Couple an array of storage drives to a radiation-hardened storage controller that provided failure-resistant data redundancy among the storage drives of the array

601

Implementing a security logic and root-of-trust between the storage controller and a bust host that accesses the array via the storage controller, the security logic providing to the bus host verification of the authenticity of the storage drives and the storage controller

602

Securely loading firmware onto the storage devices and/or instructions into the storage controller

603

Manage setup of device authentication keys, locking rules, and data bands for the storage drives

604

Execute a data wipe of persistent data stored within local memory of the storage controller

605

Store a backup encryption key usable to recover a corrupted encryption key

606

Sanitize data stored on the storage drives and receive an attestation of the data wipe from the storage controller

607

Instruct the storage controller how to enforce security properties

608

Redundantly decrypt or encrypt data stored on the storage drives and determine errors using two or more decryption/encryption engines

FIG. 6

SECURITY-ENHANCED DATA STORAGE DEVICE FOR AEROSPACE APPLICATIONS

RELATED PATENT DOCUMENTS

This application claims the benefit of India Provisional Application No. 202221048895, filed on Aug. 26, 2022, and U.S. Provisional Application No. 63/420,818, filed on Oct. 31, 2022, both of which are incorporated herein by reference in their entireties.

SUMMARY

The present disclosure is directed to a data storage device and system. In one embodiment, a system for use in a high radiation (e.g., aerospace) environment includes an array of storage drives each comprising a non-radiation-hardened drive controller, a non-radiation-hardened, non-volatile, storage medium, and a non-radiation-hardened volatile memory. The system includes a radiation-tolerant storage controller coupled to the array. The storage controller provides failure-resistant data redundancy among the storage drives of the array. The system includes a bus host that accesses the array via the storage controller. The storage controller implements security logic and a root-of-trust that provides to the bus host verification of authenticity of the radiation tolerant storage controller and the storage drives.

In some embodiments, the security logic manages one or both of secure loading of firmware onto the storage drives and secure loading of a set of security instructions into the storage controller. In such a case, at least one of the firmware and the set of instructions may be received from a ground station in wireless communication with the bus host. The security logic may manage setup of device authentication keys, locking rules, and data bands for the storage drive. The security logic may be operable to execute a data wipe of persistent data stored within local memory of the radiation-hardened storage controller. The local memory includes key stores that are erased in response to the data wipe. The data wipe may sanitize data stored on the storage drives, and the bus host receiving an attestation of the data wipe from the storage controller.

In some embodiments, the bus host further includes a security policy engine that instructs the storage controller how to enforce security properties on one or both of the storage controller and the storage drives. Instructing the storage controller may involve uploading a security manifest. In one embodiment, at least one of the storage controller and the bus host uses an authenticated encryption algorithm on stored data. In another embodiment, at least one of the storage controller and the bus host have backup encryption key stores usable to recover a corrupted encryption key used for decrypting or encrypting the data stored on the storage drives.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 6 is a flowchart of methods according to example embodiments.

DETAILED DESCRIPTION

Figures 1, 2:
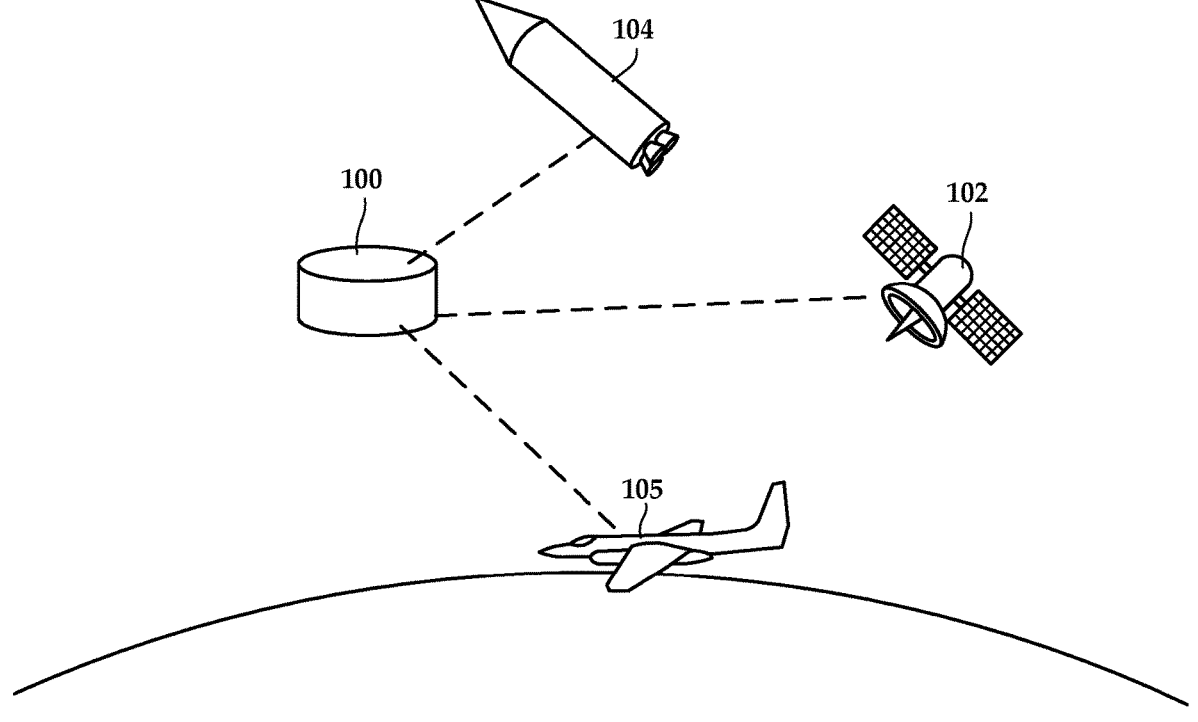
FIG. 1 is a diagram showing applications for a radiation-hardened storage device according to an example embodiment.
FIG. 2 is a diagram of a radiation-hardened storage apparatus according to an example embodiment.

This disclosure relates to the design of a data storage system using high-capacity high-performance (e.g., NAND flash) off-the-shelf commercial data storage components that is also reliable under conditions of increased radiation. In FIG. 1, a diagram shows an example of environments in which such a data storage system 100 may be employed. For example, a significant increase in cosmic radiation is well known to occur during space flight, such as in Low-Earth-Orbit (LEO) spacecraft 102. There has recently been a proliferation of LEO satellites, thanks largely to a variety of new commercial rockets with innovative satellite delivery techniques.

The desire for high-capacity data storage in LEO satellites has led to using commercial (terrestrial) products in these applications. Unfortunately, these products were not designed with the extreme radiation and temperature environments of LEO in mind and suffer from lack of reliability in this application. Other types of aerospace vehicles may also benefit from a space-qualified mass storage device, such as deep space craft 104, high altitude aircraft 105, etc. Robust "space-grade" data storage products, designed for safety-critical applications are available, however these products are very expensive and often lack the performance and storage capacity of their commercial counterparts.

There are challenges with preparing a commercial solid-state drive (SSD) for space or other remote use environments. High radiation, temperature extremes, inaccessibility for service are only some of the challenges faced in getting electronics system to operate reliably LEO and beyond. A previously filed application (U.S. patent application Ser. No. 17/869,238, filed on Jul. 20, 2022, herein incorporated by reference) discusses novel capabilities that enable a data storage system using high-capacity high-performance (e.g., NAND flash) off-the-shelf commercial data storage components that is also reliable during space flight, especially in low-Earth-orbit spacecraft. The present disclosure focusses on additional security capabilities for such high-capacity high-performance space storage systems.

The increasing number of LEO satellites and constellations has nation states looking to use space to enhance their national security capabilities. This will correspondingly lead to increased incentives for development, and potential use, of offensive capabilities. To mitigate the risk of disruption to space applications and its infrastructure, cyber-defensive counter measures will increase in importance very quickly. Whereas historically dedicated national defense satellites were designed with security in mind, commercial LEO constellations using commercial technologies are comparatively insecure and considered more vulnerable (see, e.g., www.defenseone.com/technology/2019/09/nsa-studying-satellite-hacking/160009/). And with the growing importance of these emerging LEO constellations to national security and economic operations, both state and non-state actors will increasingly see these as high-value targets.

In FIG. 2, a diagram shows an example of a data storage system 200 for use in an aerospace environment according to an example embodiment. The system includes an array of drives 202 each comprising non-radiation-hardened controllers and non-radiation-hardened, non-volatile, solid-state storage media. The storage media may include NAND flash memory, resistive random access memory (RRAM), magnetoresistive random access memory (MRAM), phase change memory (PCM), ferroelectric RAM (FeRAM), magnetic disks, etc. Note that the drives 202 are shown here as physically separate units, however some or all of the drives 202 may all be integrated into a single circuit board in some embodiments.

Generally, the drives 202 include circuitry that enables addressing the storage units of the media (e.g., pages, sectors) for purposes of reading and writing, and may include other circuits such as power conditioning, integrated error checking/recovery, garbage collection, wear leveling, etc. The drives 202 may include an industry standard common storage access interface, often referred to as a host interface. Examples of host interfaces include serial ATA (SATA), small computer system interface (SCSI), non-volatile memory express (NVMe), peripheral component interconnect express (PCIe), Compute Express Link (CXL) etc. The drives 202 may also include an industry standard physical form factor such as M.2, PCIe, 2.5 inch disk drive, etc., or may include off-the-shelf drive components integrated into one or more custom circuit boards (e.g., with more than one drive on each board). In one or more embodiments, the drives 202 may include hard disk drives (HDDs) with magnetic disks as a storage media instead of or in addition to a solid-state storage media (e.g., hybrid drive).

An array controller 204 is coupled to the array of drives 202. The controller 204 can be radiation hardened or made radiation tolerant by being manufactured with large process nodes, manufacturing on insulating and/or large bandgap substrates, use of bipolar devices, adding shielding, etc. The radiation-hardened drive controller 204 provides failure-resistant data redundancy among the drives 202 of the array. The radiation-hardened drive controller 204 provides access to the array, e.g., to a host computer (not shown). In such a case, the array may be presented as one or more virtual volumes using an arrangement such as redundant array of independent disks (RAID). Note that in one or more embodiments, multiple radiation-hardened array controllers 204 may be coupled to the array of drives 202. In such a case, the controllers 204 may operate in a high-availability arrangement, where each controller 204 acts as a primary controller for a first subset of the drives 202 and is coupled as a secondary controller for a second subset of the drives 202. If a primary controller fails, its function is taken over by the secondary controller, which then controls two subsets of the drives 202.

Figure 3:
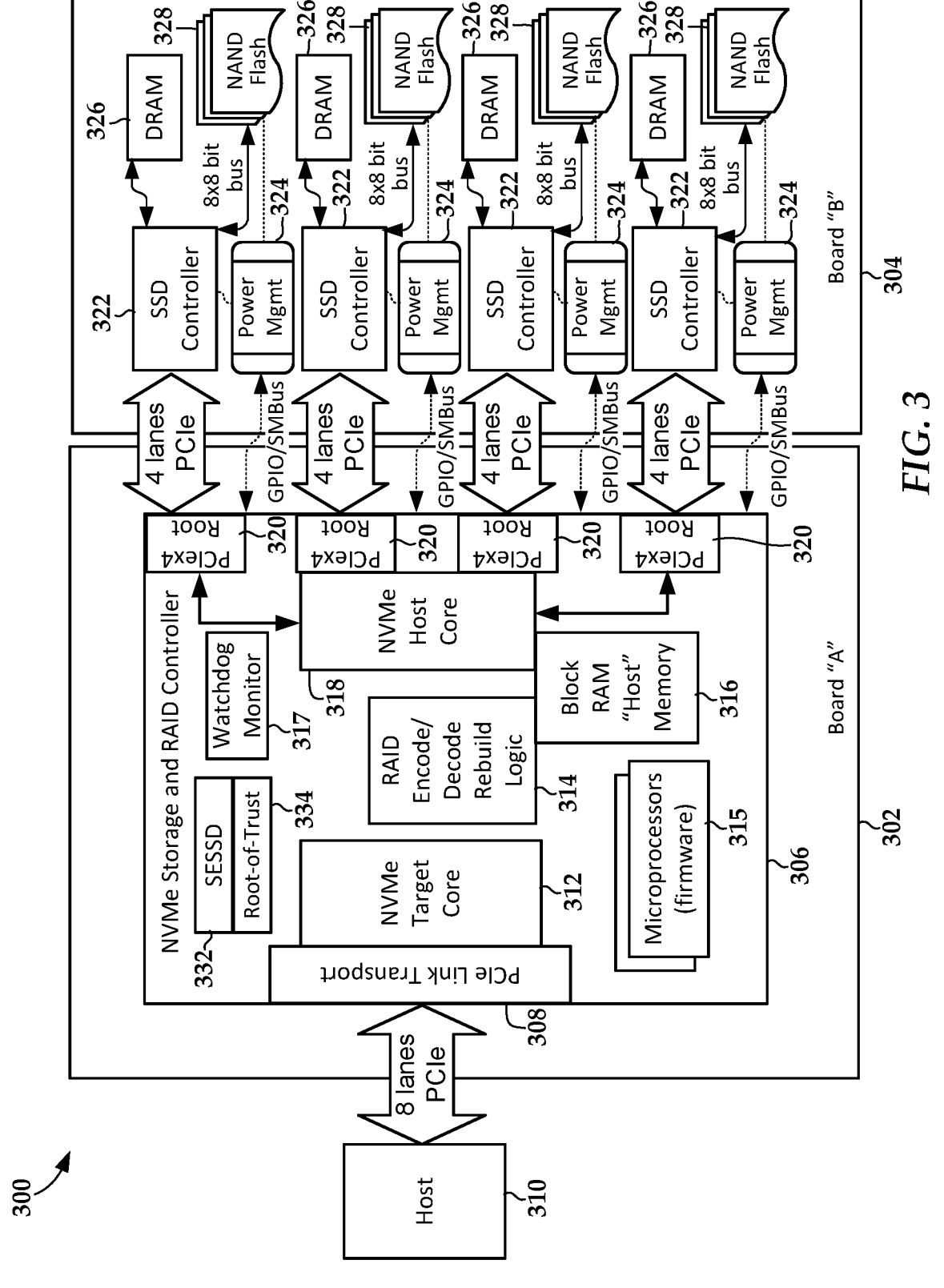
FIG. 3 is a schematic diagram of storage controller and array according to an example embodiment.

In FIG. 3, a schematic diagram shows details of a storage system 300 according to an example embodiment. The storage system 300 comprises two boards, controller board 302 and a storage array board 304. The controller board 302 includes a radiation-hardened storage controller 306 with a host interface (here shown as PCIe link transport 308 with eight PCIe lanes and NVMe target core 312) that facilitates communication with a host 310, e.g., a compute module. The NVMe target core 312 presents the storage controller 306 to the host 310 as a storage device.

In other embodiments, the storage controller 306 can use a different host interface to communicate with the host 310, such as SATA, SAS, or networking interface (e.g., Ethernet, fiber optic networking). In the latter case, the storage controller 306 could also include an embedded processor and memory for running a filesystem. A filesystem controller structures and organizes data and metadata on the storage array board 304 and may be use as a standard filesystem such as new technology file system (NTFS), ext2, ext3, ext4, etc. The radiation-hardened storage controller 306 may also provide a network file system protocol over the networking interface, such as network file system (NFS), server message block (SMB), common Internet file system (CIPS), etc.

The storage controller 306 also includes an NVMe host core 318, which connects to drives on the storage array board 304 as a host device. In this way, the storage controller 306 acts as a proxy for the drives on the storage array board 304, as well as managing the distribution of data and parity among the drives, calculating parity based on data, rebuilding data based on parity, etc. These latter functions are represented by RAID logic block 314, which is located between the NVMe target core 312 and NVMe host core 318. Other functionality of the storage controller 306 (e.g., initialization, scheduling, caching, error handling, security) is managed by firmware which runs in microprocessors 315 and utilizes random access memory (RAM) 316 for storage of instructions and data. A watchdog monitor 317 is also shown in the storage controller board 306 and monitors the system for hangs. The watchdog monitor 317 may also be physically and electrically separate from the storage controller board 306, e.g., may be on the controller board 302 separate from the storage controller 306, or located off of the controller board 302 altogether.

The NVMe host core 318 is coupled to a plurality of PCIe root ports 320. In this example, four root ports 320 are used, each with three PCIe lanes. Each of the root ports 320 connects to a corresponding SSD controller 322 on the storage array board 304. The SSD controller 322 may include a commercial, off the shelf (COTS) controller that is configured to operate with respective NAND flash memory modules 328 and dynamic RAM (DRAM) 326. While the flash memory modules 328, SSD controller 322, and DRAM 326 may be commercial off the shelf (COTS) devices, the storage array board 304 may include power management modules 324 that are custom designed or selected to be radiation-hardened or resistant. Additional features of the illustrated system 300 as well as other embodiments are described in greater detail below.

Note that while the components in FIG. 3 specifically call out SSDs that utilize NAND flash for data storage, it will be understood that other media, including magnetic disks, resistive memory, etc., may be substituted for NAND flash, in which case the SSDs may be more generally referred to as a drive or storage drive. Also note that the storage array board 304 may include a combination of non-radiation-hardened COTS circuit components and radiation-hardened circuit components, and all of the components may be attached/soldered to a single board. Nonetheless, for the purpose of the present disclosure, a collection of components (e.g., SSD controller 322, DRAM 326, NAND flash 328) coupled to each root port 320 may considered a separate storage drive for purposes of this disclosure. The power management modules 324 may be considered part of the storage drives or separate from the storage drives depending on the implementation.

This disclosure introduces a Security Enhanced Space Storage Device (SESSD), which may utilize a FPGA based controller with root-of-trust capabilities that manages multiple backend SSD storage devices. This disclosure expands on that system with the addition of a security subsystem within the storage controller (e.g., an ASIC or a FPGA) that implements a security logic and a security policy engine.

In this model, the root-of-trust functionality acts as a secure backend for the security logic and a security policy engine within the storage controller 306. This functionality is generally indicated within the storage controller 306 of FIG. 3 as SESSD block 332 and root-of-trust block 334. The root-of-trust block 334 may include a hardware root-of-trust providing services, such as secure or measured boot, cryptography, key management, and secure life-cycle management. The SESSD block 332 may include logic instructions (e.g., firmware, FPGA code) that provides security interaction functionality and uses security protocols as described below.

Figure 4:
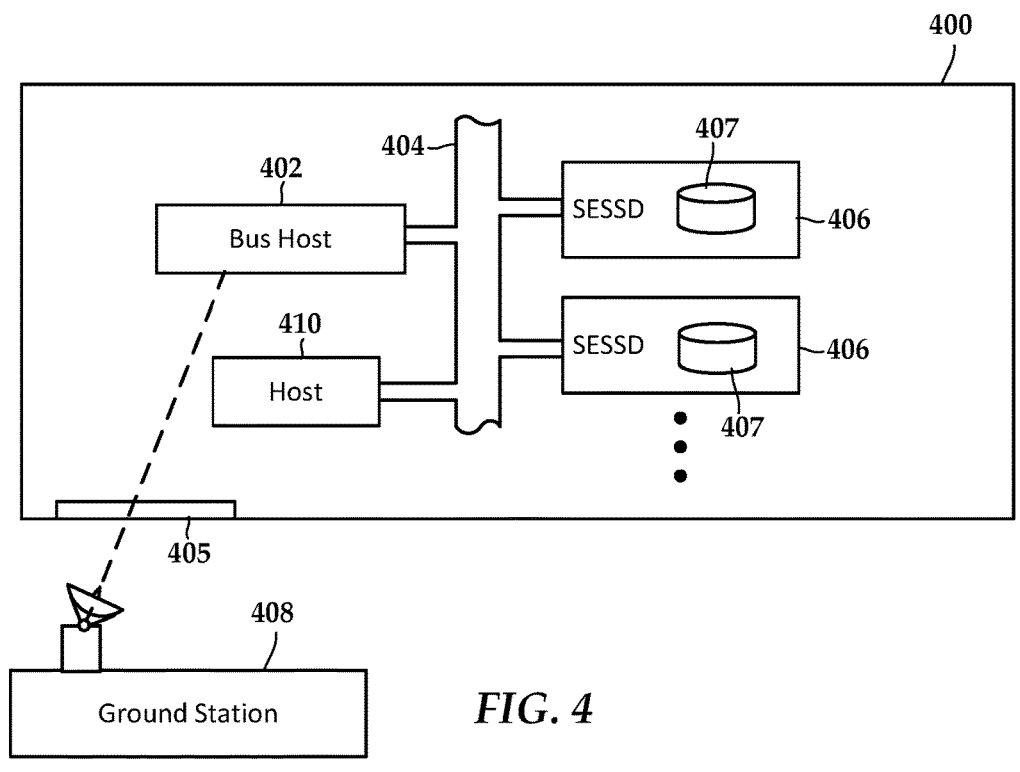
FIG. 4 is a schematic diagram of an aerospace storage bus system according to an example embodiment.

In FIG. 4, a block diagram shows additional details of an SESSD system according to an example embodiment. An aerospace system 400 (e.g., satellite) includes a bus host 402 that is coupled to a storage bus 404. A ground station 408 can communicate wirelessly with the aerospace system 400, e.g., through a secure communications interface 405. The storage bus 404 provides access to one or more SESSD 406. Each SESSD 406 has at least one drive controller coupled to one or more storage devices 407. The bus host 402 can act as a passthrough for the security management system at the ground station 408 or as a proxy to the ground station 408. The bus host 402 may include its own root-of-trust hardware to validate security during startup and operation.

The bus host 402 will (e.g., based on the desired security policy for the system) instruct the SESSD 406 how to setup its security capabilities and/or load a secure policy into the SESSD 406. The loaded secure policy may include a manifest, executable code, structured document, etc., that will instruct the SESSD 406 on how to setup its security capabilities. When the bus host 402 or any other host (e.g., host 410) on the bus 404 wants access data stored on the SESSD 406, the SESSD 406 and connecting host will have to satisfy certain access conditions, e.g., proper authentication.

Additionally, the bus host 402 may run a set of verification steps to ensure the authenticity of the SESSD 406, its configuration, and what policy the device is enforcing. Based on the results of these verification steps, the bus host 402 or ground station policy manager may decide on next steps, e.g., trust the SESSD 406 and its stored data, erase data on the SESSD 406, load a new bitstream on the SESSD 406, etc.

Figure 5:
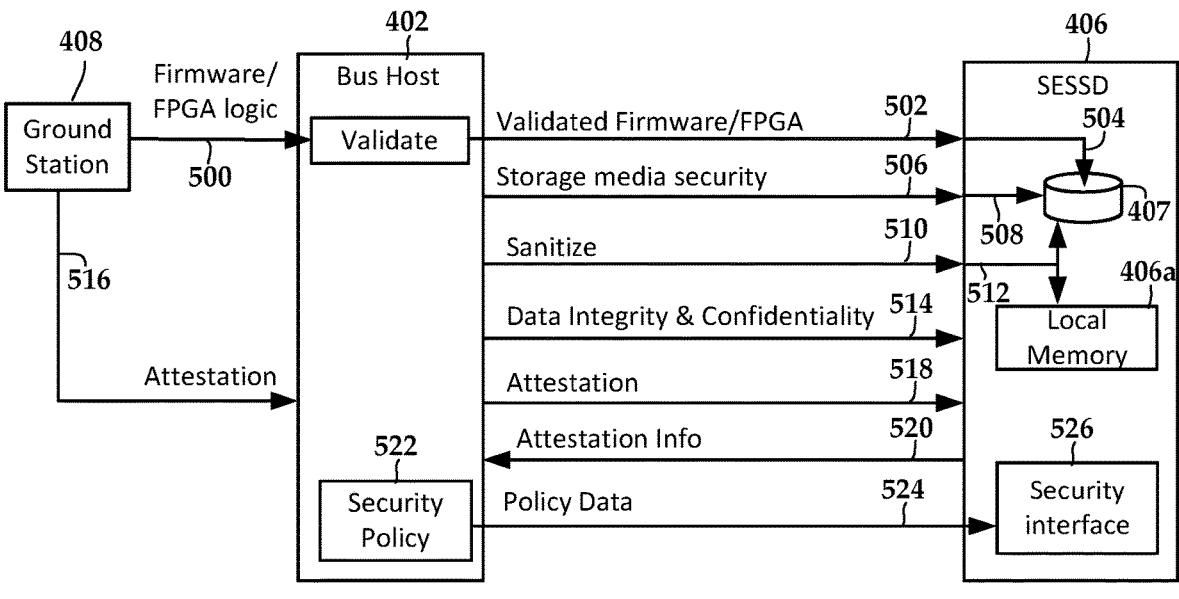
FIG. 5 is a diagram showing security features of an aerospace storage system according to an example embodiment.

Together the bus host 402 and SESSD 406 implement security logic to manage the security subsystem on the individual backend SSD storage devices, the secure loading of firmware and/or bitstream, SESSD sanitation capabilities, SESSD data integrity & confidentiality capabilities and SESSD authenticity capabilities. By acting as a passthrough for the ground station, the bus host 402 enables remote monitor and control of the storage system down to the storage device level (e.g., storage drives). This can also be used to apply operational security updates in case security flaws and/or security breaches are found after launch of the aerospace system 400. The security logic includes features shown by way of example in FIG. 5.

The bus host 402 is operable to download new binaries 502 for the SESSD 406 and may validate authenticity of those binaries 502 prior to downloading to the SESSD 406. The binaries 502 may be validated by the bus host 402 alone, by the bus host 402 and SESSD 406, or by the SESSD 406 when it boots. The binaries 502 may include a set of operating instructions (e.g., FPGA image) for the SESSD controller and firmware for the backed storage devices 407.

This allows the SESSD 406 to download new firmware 504 onto downstream individual storage devices 407, or the firmware 504 can be pushed to the storage devices via the bus host 402. The system is able to communicate data 506 used to setup individual storage device authentication keys, locking rules, and data bands, e.g., to configure 508 the security subsystem of storage media devices 407.

The system is able to execute a full data wipe of all persistent data stored for/within the controller of the SESSD 406, any local memory 406a including key stores, security manifests, and the connected backend mass storage devices 407, with optionally a controller FPGA bitstream wipe. The sanitization mechanism may use cryptographic erase for instantaneous (data) wiping and the bus host 402 may challenge the device for an attestation of the data wiping sanitization event (e.g., a signed certificate the certifies the erase). These sanitization events are generally indicated by data 510, 512.

The security logic includes means to enforce SESSD data integrity and confidentiality. Enforcement of integrity and confidentiality refers to the ability to encrypt data, enforce access controls to some or all data stored on the device, verify the identity of communication endpoints, and provide strong device cryptographic integrity guarantees. Access control enforcement may follow a multi-level security model in which data accesses are allowed or denied based on a hierarchical data classification model, e.g., the Bell-LaPadula model. This is generally indicated by policy data 524 in FIG. 5.

The security logic may instruct the SESSD to setup secure partitioning of the backend SSD storage devices 407. The individual SSD storage devices 407 will then create a set of data bands and allocate certain amounts of encrypted storage with a different encryption key for each data band. The SESSD storage controller (e.g., controller 306 in FIG. 3) maps these data bands to data partitions that are exposed to the bus host 402. An access rule for each partition determines what access the bus host 402 has: e.g., no-access, read-only access, write-once and read-always access, write-only access, read-write access, etc.

In another example, the data partitions and associated data bands are used in conjunction with a data classification scheme where the data partitions/bands are used to separately store data of different classification. For example, one data partition/band may contain data with classification Confidential and the SESSD storage controller will ensure that any data classified as such will only reside in SSD bands allocated for Confidential data. A second partition/band may contain data with a different level of classification. In order for the SESSD to determine what data is stored on what data partitions and thus SSD bands the bus host 402 may send along additional information with the data. For example, the bus host may add a tag to all data transfers to or from the SESSD 406 indicating the data classification of the stored data. Additionally, this tag may be secured using a cryptographic protection scheme, such as an HMAC. Note that in this scenario the bus host 402 may or may not encrypt the data before it is transferred to the SESSD 406.

In another example, the SESSD 406 may expose only a single data partition/band to either a specific bus host 402—in case multiple bus hosts 402 are present—or when the bus host 402 swaps its security context. Based on the authentication provided by bus host 402 and its authorization based on that authentication, the SESSD 406 will expose only the data partition that the bus host is allowed to access. For example, bus host A may only access information classified as Public based on no authentication, while bus host B may only access data classified as Confidential based on its authentication and authorization. It is noted that a single bus host 402 may run different virtual containers and that the security context of the container may determine what data partition is exposed by the SESSD 406. In this case, a bus host 402 may run containers 0 and 1, with container 0 only having access to the data partition containing data classified as Public, while container 1 has access to the data partition containing data classified as Confidential.

In another example, bus hosts 402 or the containers running on a bus host, may access multiple partitions based on their authentication and authorization. In this case, bus host A or Container 0 may have access to data partitions containing data classified as x, y, and z, while bus host B or Container 1 may only access data partitions containing data classified as s, t, and x.

The security logic will include facilities to establish and verify SESSD authenticity. This refers to the ability to take ownership by the bus host 402 or ground station 408 and for the bus host 402 to run an attestation 516, 518 against the SESSD to securely retrieve attestation information 520 which includes information about the firmware and configuration of the backend storage devices 407. The attestation information 520 may include device identity information, configuration information, currently active security policy information, etc. Attestation functionality may be provided by an existing protocol such as Security Protocol and Data Model (SPDM).

Another security aspect managed by the bus host 402 or ground station 408 includes storage life cycle management. Storage life cycle management refers to the ability to enforce security policies based on the device's life cycle (LC) state. Examples of LC states include Manufacturing, Test, Operational, Reset, and End-of-Life. During the Manufacturing state, the device is operational but does not provide any security guarantees. The Test LC state is used for Bus integration, the device is operational, but supports certain testing capabilities that limits the provided security guarantees. During the Operational state, the device was successfully integrated within its target environment and is providing the expected security guarantees. For the Reset state, the device was fully wiped and requires setup. For End-of-Life, all data on the device was wiped and the device is rendered inoperable, for example by blowing fuses or programming/erasing non-volatile memory within/nearby the controller.

The bus host 402 may include a security policy engine 522 that provides the bus host the ability to load a policy manifest onto the SESSD 406. The policy manifest 524 instructs the SESSD's security logic how to enforce certain security properties. For example, it may instruct the device to execute a LC state transition (e.g., from Test to Operational), what keys and cryptographic algorithms to use, what data access control model to enforce, etc.

The SESSD 406 implements a security interface 526 for configuring the security logic of the device, e.g., by loading of the security policy data 524. The security policy data 524 may be encoded in a machine-readable format, such as XML or JSON. The security interface 526 may manage the security properties of the SESSD 406, load the security policy manifest 524 onto the SESSD, enforce access controls, and enforce secure communications with the host systems of the bus 404. This interface 526 is access controlled, enforces its own security guarantees of confidentiality and integrity, and (optionally) uses a secure transport. Transport is provided by the underlaying transport layer, such as Ethernet, NVMe, PCIe VDM, or another transport protocol.

In addition to enhancing security of stored data, the security measures described herein can also help improve the reliability and robustness of the storage system. Generally, there are a number of possible ways of encryption. One is by the device FPGA controller only or backed SSDs only. A combination of both the FPGA controller and backend SSDs can be combined to perform encryption. Redundancy, such as parallel encryption/decryption engines with voting, parallel backup key stores, etc., can provide reliable SESSD operation in the presence of high radiation, temperature extremes, and other extreme conditions encountered in aerospace environments. For example, stored keys can be tested for corruption using two or more locally and/or remotely stored encrypted test objects (e.g., files) that can be positively identified once decrypted (e.g., conforming to known content such as all zeros, tested against a stored hash value) such that if decryption fails on at least one of the test objects, the key may have been corrupted, in which case a backup key can be retrieved and validated by decrypting the test objects. In another embodiment, this may be accomplished by shadow cores. In such an arrangement, a second core runs behind the main core and halts the system if it detects results are out of sync.

Another security measure that can be used in one or more embodiments of the system is known as authenticated encryption (AE). An AE algorithm uses an intermediate block to check on integrity of encrypted data stored on the SESSD. For example, an AE encryption may produce a message authentication code (MAC) or Authentication Tag (AT) as well as the ciphertext. The MAC or AT is supplied with the key and ciphertext during decryption and can determine errors within the data. Or the system may use a non-AE algorithm to encrypt the data and calculates a MAC value over the encrypted data. During decryption the MAC is recalculated to determine errors within the data.

The SESSD may employ a feature used in enterprise storage known as a keystore. These keystores are protected by (amongst other things) a key in the ASIC. More details on keystores can be found in U.S. Pat. No. 9,443,111, dated Sep. 13, 2016. In these embodiments, the keystores could be backed up and retrieved for redundancy. For example, the security policies may allow the keys to be distributed to other devices, then a backup key (or keystore) may be stored on a device different than the device that uses the key. For example, keys of an SES SD may be backed up to another SES SD or to the bus host. Some precautions may be taken to ensure the other device cannot use the keys. For example, schemes exist to distribute data to multiple storage nodes in a way that the hides the full data from each storage node, or even hides the data from multiple storage nodes that may be illicitly cooperating.

For parallel encryption/decryption engines with voting, two parallel encryption/decryption engines can concurrently or serially encrypt or decrypt a common object see differences in output stream bits. If differences are seen, the encryption or decryption can be reattempted. If the encryption/decryption engines are operating concurrently and in parallel, then one of the engines can be halted if it is determined which one is in error. For example, if more than two parallel encryption/decryption engines are used, a plurality of matching output streams may be assumed to be correct (e.g., a majority voting scheme), and the incorrect engine can be halted and/or restarted.

The parallel decryption/encryption can be performed by one or both of the bus host and the SESSD. For example, the storage controller of the SESSD may include two or more decryption/encryption engines, and/or the bus host may include two or more decryption/encryption engines. If the encryption is performed by the SESSD, then the multiple decryption/encryption engines on the SESSD can act as a check on one another. If the data is encrypted before being put onto the bus, then the bus host (or some other host) may have multiple decryption/encryption engines to perform these checks. Encryption redundancy may also be provided by RAID setup. In case of encryption/decryption failure, the RAID configured in this way can recover data.

In some instances where non-encrypted data is allowed on the bus, a host decryption/encryption engine can act as a check on the SESSD decryption/encryption engine. For example, the host can send an unencrypted file for encrypted storage on the SESSD, but first perform the encryption (e.g., using the same key and encryption scheme used by the SESSD) and then hash the encrypted file, the hash value being sent to the SESSD with the file. The SESSD can encrypt the file before storage, and check the encrypted file against the host-calculated hash to ensure there were no encryption errors by the SESSD.

In summary, this disclosure relates to an SESSD comprising an aerospace storage device using commercial grade SSDs and a FPGA implementing error detection and mitigation techniques for radiation-induced events, making it more robust for Low-Earth Orbit (LEO) and similar environments. The SESSD implements a hardware-based root-of-trust supporting security logic and a policy engine. Expanded FPGA capabilities on the SESSD implementing security logic for at least one of: securely loading of firmware and bitstream from a local store or via one of the device's interfaces; managing the backend storage devices' security configuration; multiple levels of device sanitization; enforcing data confidentiality and integrity; device authenticity; and device life cycle management.

In FIG. 6, a flowchart illustrates a method according to an example embodiment. The method involves coupling 600 an array of storage drives to a radiation-tolerant storage controller. Each of the storage drives has a non-radiation-hardened drive controller, a non-radiation-hardened, non-volatile, storage medium, and a non-radiation-hardened volatile memory. The radiation hardened storage controller provides failure-resistant data redundancy among the storage drives of the array.

The method further involves implementing 601 a security logic between the radiation-tolerant storage controller and a bust host that accesses the array via the radiation-tolerant storage controller. The security logic and a root-of-trust can verify to the bus host the authenticity of the storage drives and the storage controller. The flowchart also shows example operations 603-608 that may be performed as part of a security protocol established by the security logic. The security protocol may involve secure loading 602 of firmware onto the storage devices and/or a set of instructions into the storage controller. The firmware and the set of instructions may be received from a ground station in wireless communication with the bus host.

The security protocol may further involve managing 603 setup of device authentication keys, locking rules, and data bands for the storage drives. The security protocol may also involve executing 604 a data wipe of persistent data stored within local memory of the storage controller, the local memory including key stores that are erased in response to the data wipe. Wiping the key stores may be one way (but not the only way) to sanitize 606 data stored on the storage drives. The bus host can receive an attestation of the data wipe from the storage controller.

The security protocol may further involve storing 605 backup encryption keys usable to recover a corrupted encryption key used for decrypting or encrypting data stored on the storage drives. The security protocol may further involve instructing 607 the storage controller how to enforce security properties. Instructing 607 the storage controller may involve uploading a security manifest from the bus host to the storage controller, for example. The security protocol may further involve redundantly decrypting or encrypting 608 data stored on the storage drives and determine errors resulting therefrom using two or more decryption/encryption engines, the method further comprising.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 3, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage system for use in an aerospace environment, comprising:
  an array of storage drives each comprising a non-radiation-hardened drive controller, a non-radiation-hardened, non-volatile, storage medium, and a non-radiation-hardened volatile memory;
  a radiation-tolerant storage controller coupled to the array, the storage controller providing failure-resistant data redundancy among the storage drives of the array; and
  a bus host that accesses the array via the storage controller, the storage controller implementing security logic and a root-of-trust that provides to the bus host verification of authenticity of the radiation tolerant storage controller and the storage drives.

2. The data storage system of claim 1, wherein the security logic manages one or both of:
  secure loading of firmware onto the storage drives; and secure loading of a set of security instructions into the storage controller.

3. The data storage system of claim 2, wherein at least one of the firmware and the set of instructions is received from a ground station in wireless communication with the bus host.

4. The data storage system of claim 1, wherein the security logic manages setup of device authentication keys, locking rules, and data bands for the storage drive.

5. The data storage system of claim 1, wherein the security logic is operable to execute a data wipe of persistent data stored within local memory of the storage controller, the local memory including key stores that are erased in response to the data wipe.

6. The data storage system of claim 5, wherein the data wipe sanitizes data stored on the storage drives, the bus host receiving an attestation of the data wipe from the storage controller.

7. The data storage system of claim 1, wherein the bus host further comprises a security policy engine that instructs the storage controller how to enforce security properties on one or both of the storage controller and the storage drives.

8. The data storage system of claim 7, wherein instructing the storage controller comprises uploading a security manifest.

9. The data storage system of claim 1, wherein at least one of the storage controller and the bus host uses an authenticated encryption scheme on stored data.

10. The data storage system of claim 1, wherein at least one of the storage controller and the bus host comprise backup encryption key stores usable to recover a corrupted encryption key used for decrypting or encrypting the data stored on the storage drives.

11. The data storage system of claim 1, wherein the security logic is operable to:

setup secure partitioning of the array of storage drives comprising a plurality of data bands mapped to different partitions;

for each band of the data bands, allocate portions of encrypted storage for each data band with a different encryption key for each data band; and define a set of access rules for the bus host for the data bands.

12. The data storage system of claim 11, wherein at least two of the data bands are used to separate stored data of different classifications.

13. The data storage system of claim 12, wherein the bus host adds tags to data transfers to or from the storage controller indicating a data classification the stored data associated with the data transfers, the tags being secured using a cryptographic protection scheme.

14. The data storage system of claim 12, wherein the storage controller exposes to the bus host only a subset of the data bands based on a security context of the bus host.

15. A method comprising:

coupling an array of storage drives to a radiation-tolerant storage controller, each of the storage drives comprising a non-radiation-hardened drive controller, a non-radiation-hardened, non-volatile, storage medium, and a non-radiation-hardened volatile memory, the radiation hardened storage controller providing failure-resistant data redundancy among the storage drives of the array; and implementing a security logic and a root-of-trust between the radiation-tolerant storage controller and a bus host that accesses the array via the storage controller, the security logic and the root-of-trust providing verification to the bus host of authenticity of the storage controller and the storage drives.

16. The method of claim 15, further comprising, via the security logic, managing one or both of:

secure loading of firmware onto the storage drives; and secure loading of a set of instructions into the storage controller.

17. The method of claim 16, wherein at least one of the firmware and the set of instructions is received from a ground station in wireless communication with the bus host.

18. The method of claim 15, further comprising, via the security logic, managing setup of device authentication keys, locking rules, and data bands for the storage drives.

19. The method of claim 15, further comprising, via the security logic, executing a data wipe of persistent data stored within local memory of the storage controller, the local memory including key stores that are erased in response to the data wipe, wherein the data wipe sanitizes data stored on the storage drives, the method further comprising receiving an attestation of the data wipe at the bus host from the storage controller.

20. The method of claim 15, wherein the bus host further comprises a security policy engine that instructs the storage drives how to enforce security properties, wherein instructing the storage drives comprises uploading a security manifest.

* * * * *